US006395793B1

(12) United States Patent
Kadonaga et al.

(10) Patent No.: US 6,395,793 B1
(45) Date of Patent: May 28, 2002

(54) METHOD FOR PRODUCTION OF POROUS MATERIAL

(75) Inventors: Kenji Kadonaga, Takatsuki; Akiko Mitsuhashi, Sanda; Hirotama Fujimaru, Suita; Masazumi Sasabe, Kakogawa; Kazutomo Takahashi, Moriyama; Masuji Izubayashi, Nishinomiya, all of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/712,723

(22) Filed: Nov. 14, 2000

(30) Foreign Application Priority Data

Nov. 18, 1999 (JP) ............................................. 11-328682

(51) Int. Cl.⁷ .................................................. C08J 9/28
(52) U.S. Cl. ........................................... 521/64; 521/62
(58) Field of Search ..................................... 521/64, 62

(56) References Cited

U.S. PATENT DOCUMENTS

| 4,522,953 A | | 6/1985 | Barby et al. ................... 521/64 |
| 4,739,008 A | | 4/1988 | Robinson et al. ........... 524/801 |
| 4,788,225 A | | 11/1988 | Edwards et al. ............ 521/147 |
| 5,189,070 A | | 2/1993 | Brownscombe et al. ...... 521/64 |
| 5,200,433 A | * | 4/1993 | Beshouri ...................... 521/64 |
| 5,210,104 A | | 5/1993 | Bass et al. ..................... 521/64 |
| 5,252,619 A | | 10/1993 | Brownscombe et al. ...... 521/64 |
| 5,559,160 A | * | 9/1996 | Harada et al. ................. 521/64 |
| 5,750,582 A | * | 5/1998 | Harada et al. ................. 521/64 |
| 6,048,908 A | * | 4/2000 | Kitagawa ...................... 521/64 |
| 6,218,440 B1 | * | 4/2001 | Kitagawa ...................... 521/64 |

FOREIGN PATENT DOCUMENTS

| JP | 10-36411 | 2/1998 | ............ C08F/2/32 |
| WO | WO 92/16565 | 10/1992 | ............ C08F/2/18 |

* cited by examiner

*Primary Examiner*—Morton Foelak
(74) *Attorney, Agent, or Firm*—Fish & Richardson P.C.

(57) ABSTRACT

An object of this invention is to provide a method for the production of a porous material by polymerizing a water-in-oil type high internal phase emulsion in a briefer time than a conventional technique without impairing the stability of the emulsion. The object of this invention can be accomplished by a method for the production of a porous material comprising a step of polymerizing a water-in-oil type high internal phase emulsion containing a polymerization initiator, wherein the polymerization initiator is a redox type initiator combining a water-soluble oxidizing agent and a reducing agent, the reducing agent is preparatorily added to form the emulsion, and thereafter the water-soluble oxidizing agent is added to the emulsion to polymerize the added emulsion.

4 Claims, No Drawings

METHOD FOR PRODUCTION OF POROUS MATERIAL

BACKGROUND OF THE INVENTION

1. Field of the Invention

This invention, in the production of a porous material, preferably a porous material having continuous pores formed in the surface and the interior thereof and consequently containing continued cells (hereinafter occasionally referred to as "open cells") by polymerizing a water in oil type high internal phase emulsion (hereinafter occasionally referred to briefly as "HIPE"), relates to a method for the production of a porous material by the continuous operation from the step of supplying the HIPE through the step of polymerizing it. More particularly, this invention relates to a method for the production of a porous material by the continuous operation from the step of supplying the HIPE through the step of polymerizing it and in which the porous material can be extensively utilized for (1) liquid absorbent materials such as, for example, ① core materials to be used in disposable diapers for absorbing water, urine, and other excretions and ② waste oil treating agents and waste solvent treating agents to be used for absorbing oils and organic solvents; (2) energy absorbent materials such as, for example, sound absorbers and heat absorbers in automobiles and buildings for absorbing sound and heat; and (3) chemical impregnating substrates such as, for example, toiletry products impregnated with a flavoring agent, a detergent, a glossing agent, a surface protecting agent, a flame retardant, and the like.

2. Description of the Related Art

The term "HIPE" refers to an emulsion comprising a water phase, i.e. a dispersing phase (internal phase), and an oil phase, i.e. an external phase, and at a W/O ratio of not less than about 3/1. It has been known to produce a porous material from the HIPE (hereinafter occasionally abbreviated simply as the "HIPE method").

The HIPE method is an excellent process for producing a low-density foam of open cells having minute diameters, as compared with the porous material which is produced by using a foaming agent (hereinafter occasionally abbreviated as the "foam") and which is liable to produce a foam of independent cells having comparatively large diameters.

Methods for producing a foam from the HIPE have been disclosed in U.S. Pat. No. 4,522,953, U.S. Pat. No. 4,788,225, U.S. Pat. No. 5,252,619, and U.S. Pat. No. 5,189,070, for example.

A method which comprises forming an HIPE containing a water-soluble and/or oil-soluble initiator and thermally polymerizing the HIPE at 50° C. or 60° C. for 8 hours to 72 hours has been disclosed in U.S. Pat. No. 4,522,953 and U.S. Pat. No. 4,788,225. Further, a method which comprises forming an HIPE, subsequently adding a polymerization initiator thereto, and polymerizing it for four to eight hours has been disclosed in U.S. Pat. No. 5,210,104. Furthermore, a method which comprises forming an HIPE containing an initiator and then polymerizing the HIPE at 100° C. or at a temperature approximating closely thereto thereby decreasing the polymerization time to a level in the range of 3to 5hours has been disclosed in U.S. Pat. No. 5,252,619 and U.S. Pat. No. 5,189,070.

The methods disclosed in U.S. Pat. No. 4,522,953 and U.S. Pat. No. 4,788,225 require an unduly long polymerization time and suffer from deficiency in efficiency of production. Although the methods disclosed in U.S. Pat. No. 5,252,619 and U.S. Pat. No. 5, 189,070 enable the polymerization time to be decreased by using the high polymerization temperature, they entail a possibility of requiring the polymerization to continue for several hours, moreover impairing the stability of the HIPE, inducing the liberation of water, and failing to afford a porous material having an expected pore diameter.

According to the method disclosed in U.S. Pat. No. 5,210,104, although the emulsion stability of the HIPE can be improved because the HIPE is formed in the absence of a polymerization initiator and the addition of the polymerization initiator is effected after the formation of the HIPE, the polymerization time is required to last for several hours.

It is an object of this invention to develop a method for the production of a porous material which can complete the polymerization in a briefer time than conventional techniques without impairing the stability of the HIPE.

For the purpose of decreasing the polymerization time, it suffices to increase the decomposition rate of the initiator and consequently heighten the concentration of radicals in the polymerization system. Since an initiator combining an oxidizing agent and a reducing agent (redox initiator) quickly decomposes at a relatively low temperature, the use of the redox initiator for the polymerization of an HIPE can be expected to complete the polymerization in a brief time even at a low temperature sufficient not to impair the stability of the HIPE. An attempt to form an HIPE containing the redox initiator and polymerize this HIPE in such a briefer time than conventional techniques as, for example, within one hour has been ascertained to encounter several problems.

An HIPE can be obtained by stirring and emulsifying an oil phase with a water phase at a temperature in the approximate range of room temperature to 80° C. for a prescribed time. The difference between the temperature of the HIPE thus produced and the polymerization temperature may be preferably as small as possible. To be more specific, an attempt to heighten a low temperature of an HIPE to a higher polymerization temperature possibly elongates the time required for the temperature elevation to such an extent as of lowering the productivity. An attempt to heat the HIPE suddenly in a brief time possibly results in impairing the stability of the HIPE and degrading the quality of the produced porous material. On the other hand, an attempt to emulsify an HIPE at a temperature approximating closely to a polymerization temperature thereof may entail a clear phenomenon of giving rise to a polymerizing reaction of the HIPE and inducing the HIPE to solidify in an emulsifying device during the course of the emulsification, and thus suffering the HIPE to emulsify insufficiently.

SUMMARY OF THE INVENTION

The present inventors, after pursuing a diligent study in order to form an HIPE stably at a temperature approximating closely to the polymerization temperature and realizing the polymerization in a brief time by using a redox initiator, have found that by forming an HIPE containing solely a reducing agent and thereafter incorporating a water-soluble oxidizing agent in the HIPE, the polymerization of the HIPE can be completed in a brief time without entailing any trouble of suffering the HIPE to polymerize during the process of preparing HIPE by mixing and emulsifying the water phase with the oil phase and consequently impairing the emulsion stability the homogeneity of the emulsified product. This invention has been perfected based on this knowledge.

A method for production of porous cross-linked polymer material which comprises separately adding an oxidizing agent and a reducing agent of a redox type initiator has been disclosed in JP-A-10-36,411. This method as disclosed therein comprises, in the polymerization of an HIPE with a redox type initiator, preparing in advance an HIPE with a water-soluble oxidizing agent added thereto, adding an aqueous solution of a reducing agent to the mixture and thereafter polymerizing the resultant HIPE mixture. This method is mainly targeted at obtaining a porous cross-linked polymer material having a decreased volume contraction ratio of the HIPE before and after the polymerization and excelling in physical properties. The present inventors have found that the method can also serve effectively as means for stably forming an HIPE and polymerizing the HIPE in a brief time as aimed at by the present invention. After further continuing the study in detail, they have found that this method has problems yet to be solved. Specifically, it has been ascertained to the inventors that while no serious problems arise when an HIPE having added sodium persulfate (as a water-soluble oxidizing agent) is emulsified at room temperature as disclosed in JP-A-10-36,411 or when the temperature exceeding the normal room temperature remains within the approximate bounds of 40° C., a possibility that the HIPE would partially be polymerized and the state of emulsification would become ununiform during the course of emulsification arises when the emulsification temperature is high. In contrast, the method for production of this invention is capable of infallibly retaining the stability of the HIPE because it comprises forming an HIPE by adding a reducing agent having no ability to initiate the polymerization and subsequently adding an oxidizing agent to the HIPE. The present inventors have further found that when the emulsification is effected after the addition of a reducing agent, the reducing agent can manifest effects of reducing and removing dissolved oxygen liable to retard the polymerization and effects of smoothly initiating the polymerization as well. They have perfected this invention based on this knowledge.

To be specific, an object of this invention can be accomplished by a method for the production of a porous material comprising a step of polymerizing a water-in-oil type high internal phase emulsion containing a polymerization initiator, wherein the polymerization initiator is a redox type initiator combining a water-soluble oxidizing agent and a reducing agent, the reducing agent is preparatorily added to form the emulsion, and thereafter the water-soluble oxidizing agent is added to the emulsion to polymerize the added emulsion.

Since this invention uses a redox type initiator combining a water-soluble oxidizing agent and a reducing agent, and comprises preparing in advance an HIPE containing the reducing agent and thereafter effecting the polymerization of the HIPE by adding the water-soluble oxidizing agent to the HIPE, it permits the polymerization to be completed in such a brief time as falling within one hour without impairing the emulsion stability during the formation of the HIPE. It may be rated as an unusually effective technique for the production of a porous material particularly by continuous polymerization.

The above and other objects, features and advantages of the present invention will become clear from the following description of the preferred embodiments.

DETAILED DESCRIPTION OF THE PREFERRED EMBODIMENT(S)

This invention relates to a method for the production of a porous material comprising a step of polymerizing an HIPE in the presence of a polymerization initiator, wherein a redox type initiator comprising a water-soluble oxidizing agent and a reducing agent in combination is used as the polymerization initiator, the reducing agent is added prior to the preparation of HIPE, and the water-soluble oxidizing agent is added to the HIPE prior to the polymerization thereof.

The component steps of the method of this invention for the production of a porous material will be described below sequentially in the order of their occurrence.

[I] Raw Material (HIPE)

(1) Composition of HIPE

The components of the HIPE which can be used in the method for the production of a porous material contemplated by this invention does not need to be particularly discriminated. It may be properly selected among compositions heretofore known in the art to suit the purpose for which the product is intended to be used. The composition of the HIPE is only required specifically to contain as essential components (a) a polymerizing monomer component containing at least one polymerizing unsaturated group in the molecular unit thereof, (b) a surfactant, (c) water, and (d) a redox type initiator using a water-soluble oxidizing agent and a reducing agent in combination. It may optionally contain (e) a salt and (f) another additive as arbitrary components as well.

(a) Polymerizing Monomer Component

The polymerizing monomer component which constitutes the HIPE mentioned above is a compound having at least one polymerizing unsaturated group in the molecular unit thereof. Though it does not need to be particularly restricted so long as it can form a water-in-oil type high internal phase emulsion and be polymerized in the emulsion, the polymerizing monomer component may preferably contain both (a-1) a polymerizing monomer having one polymerizing unsaturated group in the molecular unit thereof and (a-2) a cross-linking monomer having at least two polymerizing unsaturated groups in the molecular unit thereof.

(a-1) Polymerizing Monomer Having at Last One Polymerizing Unsaturated Group in the Molecular Unit Thereof Though this polymerizing monomer does not need to be particularly limited, it may properly contain at least partly a (meth)acrylic ester, preferably not less than 20% by mass of a (meth)acrylic ester, and particularly preferably not less than 35% by mass of a (meth)acrylic ester. As the polymerizing monomer having one polymerizing unsaturated group in the molecular unit thereof, a polymerizing monomer containing a (meth)acrylic ester may desirably be used because the ester permits the production of a porous material excelling in flexibility and toughness.

As typical examples of the polymerizing monomer of (a-1) mentioned above, allylene monomers such as styrene; monoalkylene allylene monomers such as ethyl styrene, alpha-methyl styrene, vinyl toluene, and ethyl vinyl benzene; (meth)acrylic esters such as methyl (meth)acrylate, ethyl (meth)acrylate, butyl (meth)acrylate, isobutyl (meth)acrylate, isodecyl (meth)acrylate, 2-ethylhexyl (meth)acrylate, lauryl (meth)acrylate, stearyl (meth)acrylate, cyclohexyl (meth)acrylate, and benzyl (meth)acrylate; chlorine-containing monomers such as vinyl chloride, vinylidene chloride, and chloromethyl styrene; acrylonitrile compounds such as acrylonitrile and methacrylonitrile; and vinyl acetate, vinyl propionate, N-octadecyl acrylamide, ethylene, propylene, and butene may be cited. These polymerizing monomers may be used either singly or in the form of a mixture of two or more members.

The content of the polymerizing monomer of (a-1) mentioned above is preferably in the range of 10 to 99.9% by mass, based on the total mass of the monomer component of (a) mentioned above, because the content in this range permits the produced porous material to acquire pores of very minute diameter. It is more preferably in the range of 30 to 99% by mass and particularly preferably 30 to 70% by mass. If the content of the polymerizing monomer of (a-1) mentioned above is less than 10% by mass, the shortage would be possibly at a disadvantage in embrittling the produced porous material friable and lowering the water absorption. Conversely, if the content of the polymerizing monomer of (a-1) mentioned above exceeds 99.9% by mass, the excess would be possibly at a disadvantage in preventing the produced porous material from acquiring sufficient strength and elastic recovery and from securing a sufficiently large water absorption capacity and a sufficient water-absorbing speed.

(a-2) Cross-linking Monomer Having at Least Two Polymerizing Unsaturated Groups in the Molecular Unit Thereof Another member of the polymerizing monomer component of (a) above is a cross-linking monomer having at least two polymerizing unsaturated groups in the molecular unit thereof. This cross-linking monomer does not need to be particularly restricted but is only required to be capable of being polymerized in the water-in-oil type high internal phase emulsion and forming the emulsion similarly to the polymerization monomer of (a-1) mentioned above.

As typical examples of the cross-linking monomer of (a-2) mentioned above, aromatic monomers such as divinyl benzene, trivinyl benzene, divinyl toluene, divinyl xylene, p-ethyl-vinylbenzene, divinyl naphthalene, divinyl alkyl benzenes, divinyl phenanthrene, divinyl biphenyl, divinyl diphenyl methane, divinyl benzyl, divinyl phenyl ether, and divinyl diphenyl sulfide; oxygen-containing monomers such as vinyl furan; sulfur-containing monomers such as divinyl sulfide and divinyl sulfone; aliphatic monomers such as butadiene, isoprene, and pentadiene; ethylene glycol di(meth)acrylate, diethylene glycol di(meth)acrylate, triethylene glycol di(meth)acrylate, polyethylene glycol di(meth)acrylate, 1,3-butane diol di(meth)acrylate, 1,4-butane diol di(meth)acrylate, 1,6-hexane diol di(meth)acrylate, octane diol di(meth)acrylate, decane diol di(meth)acrylate, trimethylol propane di(meth)acrylate, trimethylol propane tri(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol tetra(meth)acrylate, N,N'-methylene bis(meth)acrylamide, triallyl isocyanurate, triallyl amine, and tetraallyloxy ethane, and ester compounds of such a polyhydric alcohol as hydroquinone, catechol, resorcinol, and sorbitol with acrylic acid or methacrylic acid may be cited. These cross-linking monomers may be used either singly or in the form of a mixture of two or more members.

The content of the cross-linking monomer of (a-2) mentioned above is properly in the range of 0.1 to 90% by mass, preferably 1 to 70% by mass, and particularly preferably 30 to 70% by mass, based on the total mass of the monomer component of (a) mentioned above. If the content of the cross-linking monomer mentioned above is less than 0.1% by mass, the shortage would be possibly at a disadvantage in preventing the produced porous material from acquiring sufficient strength and sufficient power of elastic recovery, manifesting a sufficient absorption capacity per unit volume or per unit mass, and securing a sufficient water absorption capacity and water-absorbing speed. Conversely, if the content of the cross-linking monomer mentioned above exceeds 90% by mass, the excess would be possibly at a disadvantage in embrittling the porous material and lowering the water absorption.

(b) Surfactant

The surfactant which is essential for the construction of the HIPE mentioned above does not need to be particularly restricted but is only required to be capable of emulsifying a water phase in an oil phase forming the HIPE. The nonionic surfactants, cationic surfactants, anionic surfactants, and amphoteric surfactants which have been heretofore known to the art may be used.

Among these surfactants, the nonionic surfactants include nonyl phenol polyethylene oxide adducts; block polymers of ethylene oxide and propylene oxide; sorbitan fatty acid esters such as sorbitan monolaurate, sorbitan monomyristylate, sorbitan monopalmitate, sorbitan monostearate, sorbitan tristearate, sorbitan monooleate, sorbitan trioleate, sorbitan sesquioleate, and sorbitan distearate; glycerin fatty acid esters such as glycerol monostearate, glycerol monooleate, diglycerol monooleate, and self-emulsifying glycerol monostearate; polyoxyethylene alkyl ethers such as polyoxyethylene lauryl ether, polyoxyethylene cetyl ether, polyoxyethylene stearyl ether, polyoxyethylene oleyl ether, and polyoxyethylene higher alcohol ethers; polyoxyethylene alkylaryl ethers such as polyoxyethylene nonylphenyl ether; polyoxyethylene sorbitan fatty acid esters such as polyoxyethylene sorbitan monolaurate, polyoxyethylene sorbitan monomyristylate, polyoxyethylene sorbitan monopalmintate, polyoxyethylene sorbitan monostearate, polyoxyethylene sorbitan tristearate, polyoxyethylene sorbitan monooleate, and polyoxyethylene sorbitan trioleate; polyoxyethylene sorbitol fatty acid esters such as tetraoleic acid polyoxyethylene sorbit; polyoxyethylene fatty acid esters such as polyethylene glycol monolaurate, polyethylene glycol monostearate, polyethylene glycol distearate, and polyethylene glycol monooleate; polyoxyethylene alkyl amines; hydrogenated polyoxyethylene castor oil; and alkyl alkanol amides, for example. They may preferably have HLB not exceeding 10, more preferably in the range of 2 to 6. These nonionic surfactants may be used in the form of a combination of two or more members. This combined use may possibly result in improving the stability of the HIPE.

The cationic surfactants include quaternary ammonium salts such as stearyl trimethyl ammonium chloride, ditallow dimethyl ammonium methyl sulfate, cetyl trimethyl ammonium chloride, distearyl dimethyl ammonium chloride, alkylbenzyl dimethyl ammonium chloride, and lauryl trimethyl ammonium chloride; alkyl amine salts such as coconut amine acetate, and stearyl amine acetate; alkyl betaines such as lauryl betaine, stearyl betaine, and lauryl carboxymethyl hydroxyethyl imidazolium betain; and amine oxides such as lauryl dimethyl amine oxide, for example. The use of such a cationic surfactant may possibly enable the produced porous material to manifest excellent antibacterial properties when the material is used for an absorbent material, for example.

The anionic surfactant of a kind having an anionic moiety and an oil-soluble moiety can be advantageously used. As typical examples of the anionic surfactant, such reactive anion emulsifiers having a double bond as, for example, alkyl sulfates such as sodium dodecyl sulfate, potassium dodecyl sulfate, and ammonium alkyl sulfate; sodium dodecyl polyglycol ether sulfate; sodium sulforicinoate; alkyl sulfonates such as sulfonated paraffin salts; sodium dodecyl benzene sulfonate, alkyl sulfonates such as alkali metal sulfates of alkali phenol hydroxyethylene; higher alkyl naphthalene sulfonates; fatty acid salts such as naphthalene sulfonic acid formalin condensate, sodium laureate, triethanol amine oleate, and triethanol amine apiate; polyoxyalkyl ether sulfuric esters; sulfuric esters of polyoxyethylene carboxylic ester and polyoxyethylene phenyl ether sulfuric esters; succinic acid dialkyl ester sulfonates; and polyoxy ethylene alkyl aryl sulfates may be cited. An HIPE may be prepared by using an anionic surfactant in combination with a cationic surfactant.

Incidentally, the combined use of a nonionic surfactant and a cationic surfactant may possibly result in improving the stability of the HIPE.

The content of the surfactant mentioned above may be preferably in the range of 1 to 30 parts by mass, more preferably 3 to 15 parts by mass, based on 100 parts by mass of the total mass of the monomer component of (a) mentioned above. If the content of the surfactant is less than 1 part by mass, the shortage would be at a disadvantage in possibly impairing the stability of the high dispersibility of the HIPE and preventing the surf actant from sufficiently manifesting the operation and function inherent therein. Conversely, if the content of the surfactant exceeds 30 parts by mass, the excess would be at a disadvantage in possibly rendering the produced porous material excessively brittle and disrupting the expected proportionate addition to the effects of the surfactant.

(c) Water

As the water which is an essential component for the construction of the HIPE mentioned above, in addition to purified water and deionized water, waste water to be obtained in the production of the porous material may be used either in its unmodified form or after it has been given a prescribed treatment with a view to promoting the reuse of the waste water.

The content of the water mentioned above may be properly selected to suit the purpose f or which the porous material containing open cells aimed at is used (for example, a water absorbent material, an oil absorbent material, a soundproof material, and a filter). It may be decided, for example, so that the HIPE eventually produced will assume an expected water phase/oil phase (W/O) ratio which will be specifically described herein below.

(d) Polymerization Initiator

The polymerization initiator which is an essential component for the construction of the HIPE mentioned above is a redox initiator which combines a water-soluble oxidizing agent and a reducing agent. Optionally, it may be used in combination with another polymerization initiator.

The water-soluble oxidizing agent does not need to be particularly limited but water-soluble oxidizing agents which have been heretofore used for the polymerization of HIPE may be used. As typical examples of the water-soluble oxidizing agent, persulfates such as potassium persulfate, sodium persulfate, and ammonium persulfate; and peroxides such as hydrogen peroxide, potassium peracetate, sodium peracetate, potassium percarbonate, sodium percarbonate, and t-butyl hydroxyperoxide may be cited.

The amount of the water-soluble oxidizing agent mentioned above to be used may be preferably in the range of 0.05 to 15% by mass, more preferably 1.0 to 10% by mass, based on the total amount of the monomer component of (a) mentioned above. If the amount of the water-soluble oxidizing agent to be used is less than 0.05% by mass, the shortage would be at a disadvantage in suffering unaltered monomer components to increase unduly and consequently suffering the produced porous material to have an unduly large residual monomer content. Conversely, if the amount of the water-soluble oxidizing agent to be used exceeds 15% by mass, the excess would be at a disadvantage in rendering the polymerization difficult to control and degrading the mechanical properties of the produced porous material.

Further, the reducing agent does not need to be particularly limited and may be either an oil-soluble or water-soluble reducing agent. As typical examples of the reducing agent mentioned above, water-soluble reducing agents such as sodium hydrogen sulfite, potassium hydrogen sulfite, sodium thiosulfate, potassium thiosulfate, L-ascorbic acid, erythorbic acid, ferrous salts, formaldehyde sodium sulfoxylate, glucose, dextrose, triethanol amine, and diethanol amine; and oil-soluble reducing agents such as dimethyl aniline, diethyl aniline, dimethyl orthotoluidine, cobalt naphthenate, cobalt octanate, zirconium naphthenate, lead naphthenate, and zinc naphthenate may be cited.

The amount of the reducing agent mentioned above to be used may be preferably in the range of 0.05 to 15% by mass, more preferably 1.0 to 10% by mass, based on the total amount of the monomer component of (a) mentioned above. If the amount of the reducing agent to be used is less than 0.05% by mass, the shortage would be at a disadvantage in suffering unaltered monomer components to increase unduly and consequently suffering the produced porous material to have an unduly large residual monomer content. Conversely, if the amount of the reducing agent to be used exceeds 15% by mass, the excess would be at a disadvantage in rendering the polymerization difficult to control and degrading the mechanical properties of the produced porous material.

The ratio (mass ratio) of the amounts of the water-soluble oxidizing agent and the reducing agent to be used, i.e., the ratio of the water-soluble oxidizing agent to the reducing agent, maybe in the range of 1/0.01 to 1/10, preferably 1/0.05 to 1/2. If the ratio (mass ratio) of the amounts of the water-soluble oxidizing agent and the reducing agent to be used, i.e., the ratio of the water-soluble oxidizing agent to the reducing agent, falls outside the range of 1/0.01 to 1/10, the deviation would be at a disadvantage in degrading the efficiency of initiating the polymerization.

These redox initiators may be used either singly or in the form of a mixture of two or more members.

The redox initiator which combines a water-soluble oxidizing agent and a reducing agent as mentioned above, when necessary, may be used in combination with an oil-soluble oxidizing agent. As typical examples of the oil-soluble oxidizing agent, such peroxides as cumene hydroperoxide, t-butylhydroperoxide, di-t-butyl peroxide, diisopropyl benzene hydroperoxide, p-menthane hydroperoxide, 1,1,3,3-tetramethylbutyl hydroperoxide, 2,5-dimethylhexane-2,5-dihydroperoxide, benzoyl peroxide, and methylethyl ketone peroxide may be cited.

(e) Salts

The salt which is one of the arbitrary components for the construction of the HIPE mentioned above may be optionally used for the purpose of improving the stability of the HIPE.

As typical examples of the salt, water-soluble salts including halogenides, sulfates, and nitrates of alkali metals and alkaline earth metals such as calcium chloride, sodium sulfate, sodium chloride, and magnesium sulfate may be cited. These salts may be used either singly or in the form of a mixture of two or more members. The salt may be preferably added to the water phase. Among other salts cited above, a polyvalent metal salt may be used advantageously from the viewpoint of the stability of the HIPE during the polymerization.

The amount of the salt to be used may be such that the concentration of the salt dissolved in water would fall in the range of 0.1 to 20% by mass, preferably 0.5 to 10% by mass. If the amount of the salt to be used exceeds 20% by mass, the excess would be at a disadvantage economically in causing the waste water squeezed out of the HIPE to contain a salt copiously and adding to the cost of disposal of this waste water without bringing a proportionate addition to the expected effects. If the amount of the salt is less than 0.1% by mass, the shortage would possibly prevent the added salt to manifest the operation and the effect satisfactorily.

(f) Other Additive

Other various kinds of additives may be properly used provided that they be capable of imparting qualities and functions of their own and consequently resulting in improving the production conditions, the properties of the HIPE, and the performance of the porous material. For example, a base and/or a buffer may be added for the purpose of pH adjustment. The contents of these other additives may be properly decided so as to ensure thorough manifestation of qualities, functions, and economy commensurate to the respective purposes of addition. The timing for the addition is only required to be such that a relevant additive would effectively manifest the performance and function thereof without imparting any adverse effect to the properties of the HIPE. The addition may be made in advance to the water phase and/or the oil phase. Alternatively, the addition may be made during the preparation of the HIPE by mixing the water phase with the oil phase. Otherwise, the addition may be separately made to the HIPE which has been prepared.

(2) Production of HIPE (a) Step for Formation (Step for Emulsification) of HIPE

For a start, the composition of the HIPE according to this invention may contain a redox initiator which combines a water-soluble oxidizing agent and a reducing agent as described above. Hereinafter unless otherwise specified, the HIPE may be construed to include both kinds, i.e. ① an HIPE which contains both the water-soluble oxidizing agent and the reducing agent as combined in the form of a redox initiator, and ② an HIPE which is prepared by adding only the reducing agent of the redox initiator in advance. Exclusively when these two kinds must be particularly discriminated as when the subject matter such as "W/O" which will be specifically described herein below must be clarified, for example, the HIPE of the kind of ① above will be referred to as "HIPE (completed product)" and the HIPE of the kind of ② above as "HIPE (intermediate product)".

This invention effects the preparation of the HIPE by a method which comprises combining the oil phase which is a mixture of a monomer component, a surf actant, etc. and the water phase which is a mixture of water, a water-soluble salt, etc. and stirring them till the emulsification has been attained to form an HIPE.

According to this invention, a redox initiator which combines a water-soluble oxidizing agent and a reducing agent as described above is used, in which the reducing agent is added to and mixed with an oil phase and/or a water phase in advance to prepare the oil phase and the water phase, and then they are combined, stirred and emulsified to obtain an HIPE (intermediate product). It is convenient for the reducing agent to be added in advance to the oil phase when it is soluble in oil or to the water phase when it is soluble in water. It is also conceivable to add to the water phase an emulsion of an oil-soluble oxidizing agent or an emulsion of an oil-soluble reducing agent. More specifically, an uniform oil phase may be prepared by stirring components for forming the oil phase, i.e. the monomer component mentioned above and the oil-soluble reducing agent (which may be or may not be additionally used when a water-soluble reducing agent or an emulsion of an oil-soluble reducing agent is used in a water phase side), in the respective amounts specified above at a prescribed temperature. Separately, an uniform water phase may be prepared by adding with stirred the components for forming the water phase, i.e. a water-soluble reducing agent and/or an emulsion of an oil-soluble reducing agent (which may be or may not be additionally used when an oil-soluble reducing agent is used in the oil-phase side), and a salt, in water and heating the resultant mixture to a prescribed temperature in the range of 30 to 95° C. The optimum temperature of the water phase and the oil phase is in the range of 20 to 100° C. From the viewpoint of the stability of the HIPE, it is preferably in the range of 40 to 95° C. Incidentally, it is commendable to mix the oil phase and the water phase after both or either of these phases has the temperature thereof adjusted preparatorily to a prescribed level. At the step of forming the HIPE, this preparatory adjustment of the temperature to the prescribed level may be preferably effected on the water phase because of the larger amount thereof. Then, the HIPE can be stably prepared by mixing the water phase with the oil phase efficiently and exerting a proper shear force to bear on the mixture being formed.

(b) Temperature for Forming (Temperature for Emulsification)

When the HIPE is formed by adding an oxidizing agent such as a peroxide and then mixing the components till emulsification as in the case of a conventional method, the emulsification must be carried out at a temperature low enough to prevent the emulsification from inducing the polymerization due to thermal decomposition of the peroxide. The method for production according to this invention allows the temperature for forming (temperature for emulsifying) the HIPE to be freely selected because the absence of an oxidizing agent which generates a radical by thermally decomposing itself during the preparation of the HIPE. In addition, in the method of this invention, since a water-soluble oxidizing agent is added following the formation of an HIPE, i.e., no oxidizing agents are contained during the emulsification process, such a situation may not be generated as that the polymerization of the HIPE would be occurred in an emulsifier to destroy the emulsified state, and therefore a good HIPE can be formed, even when the emulsification is carried out at a temperature approximating closely to the polymerization temperature. For the sake of shortening the time spent in elevating the temperature from the step of emulsification to the step of polymerization, decreasing the energy required therefor, and exalting the efficiency of production and the efficiency of energy, the temperature for the formation (the temperature for emulsification) of the HIPE, therefore, is preferred to be such that the emulsion may proceed at a temperature approximating closely to the polymerization temperature. When the difference between the temperature for forming (temperature for emulsifying) the HIPE and the polymerization temperature is small, this small difference of temperature would be at an advantage in enabling the temperature elevation to be attained by simply applying heat with an ordinary heating device such as a hot air or hot water constant temperature bath and not requiring the use of a special heating device. The difference between the temperature for forming (temperature for emulsifying) the HIPE and the polymerization temperature, therefore, may be preferably not more than 20° C., more preferably not more than 10° C., and particularly preferably not more than 5° C. Further, both the temperature for forming (temperature for emulsifying) the HIPE and the polymerization temperature may be properly not less than 40° C., preferably in the range of 50 to 95° C., particularly preferably in the range of 60 to 85° C., and most preferably in the range of 65 to 85° C. If the forming temperature (and also the polymerization temperature) of the HIPE is less than 40° C., the shortage would be at a disadvantage in lowering the velocity of polymerization.

(c) Step for Adding Water-soluble Oxidizing Agent

At the step of adding the water-soluble oxidizing agent to the HIPE, the water-soluble oxidizing agent which is destined to form the redox system in combination with the reducing agent mentioned above may be added in an amount falling in the range mentioned above to the HIPE (intermediate product) obtained at the forming step (step for emulsification) in (a) mentioned above and mixed together. The water-soluble oxidizing agent mentioned above may be added to the HIPE either in an undiluted state or in the form of a solution obtained by dilution with a diluting medium such as water or an organic solvent. The added water-soluble oxidizing agent may be quickly and uniformly mixed. Further, the HIPE which is obtained by mixing with the water-soluble oxidizing agent may be introduced into a polymerization vessel or a continuous polymerization device as quickly as possible. Since the method of this invention forms (emulsifies) the HIPE by preparatory addition of the reducing agent, the produced HIPE has the reducing agent distributed uniformly therein. Since the water-soluble oxidizing agent is admixed with the HIPE of the quality described above and, consequently, the oxidizing agent and the reducing agent can be distributed easily and uniformly throughout the entire volume of the HIPE and enabled to manifest effects of removing dissolved oxygen, the polymerization can proceed at a high velocity and the produced porous material can be free from variation of quality.

As a means to effect the admixture of the water-soluble oxidizing agent with the HIPE, it is commended to adopt a method which comprises providing an oxidizing agent inlet in a path from an emulsifier for producing the HIPE to a polymerization vessel or a continuous polymerization device, adding the water-soluble oxidizing agent to the HIPE via this inlet, and mixing them by the use of a line mixer.

The inner temperature of the system operating the step for adding the water-soluble oxidizing agent mentioned above may be preferably set so as to retain the emulsification temperature of (b) mentioned above.

The HIPE (completed product) consequently obtained may be generally a white highly viscous emulsion.

(d) Apparatus for Production of HIPE

The apparatus for the production of the HIPE does not need to be particularly discriminated but may be selected among apparatuses for production of HIPE heretofore known to the art. As the stirrer (emulsifying device) to be used for mixing the water phase with the oil phase, conventional stirring devices and mixing devices may be used. As typical examples thereof, stirring devices provided with propeller type, paddle type, and turbine type vanes, homomixers, line mixers, and pin mills may be cited. Any of these devices may be used. Further, as the stirrer to be used for mixing the water-soluble oxidizing agent with the HIPE, conventional stirring devices may be used. As typical examples thereof, line mixers, static mixers, and stirring devices provided with propeller type, paddle type, and turbine type vanes may be cited. Any of these devices may be used.

(e) Water Phase/oil Phase Ratio (Mass Ratio)

The water phase/oil phase ratio (mass ratio) of the HIPE (completed product) (hereinafter occasionally abbreviated simply as "W/O ratio") is not less than 3/1. The void ratio of the porous material may be decided by varying the W/O ratio. It is, therefore, commendable to select the W/O ratio so as to obtain a void ratio conforming to the use and the object. When the produced porous material is used in a disposable diaper or a sanitary material, the W/O ratio may be preferably set within the approximate range of 10/1–100/1.

[II] Polymerization of HIPE (1) Method for Polymerization of HIPE

Then, the method for polymerizing the HIPE mentioned above does not need to be particularly limited but may be properly selected among methods for the HIPE polymerization heretofore known to the art. For example, the polymerization may be preferably carried out by the method of standing polymerization under the conditions incapable of disrupting the configuration of water drops highly dispersed in the oil phase of the HIPE. This method of static polymerization has been known in various types such as a batch polymerization method which polymerizes the HIPE batchwisely, a continuous polymerization method which cast polymerizes the HIPE, and a method which effects the polymerization of the HIPE by suitably combining these methods (for example, a combined continuous and batch polymerization method which comprises continuously feeding the HIPE, reeling it, and batch polymerizing the reeled HIPE). These types of methods can be properly used to suit the occasion. For the purpose of harnessing to advantage the effect of quick polymerization which features the method for the production contemplated by this invention, the polymerization may prefer the continuous polymerization method to the batch polymerization method. For example, the continuous polymerization method which comprises continuously casting the HIPE on a belt (a conveying support) in motion and polymerizing the cast HIPE may be properly adopted. Now, the typical polymerization method will be described below. Naturally, this invention is not limited to this method.

(2) Polymerization Temperature

The temperature for the polymerization of the HIPE may be in the range of normal room temperature to 100° C. From the viewpoint of the stability of the HIPE and the velocity of polymerization, this temperature may be preferably in the range of 40 to 100° C., more preferably 50 to 95° C., particularly preferably 60 to 85° C., and most preferably 65 to 85° C. If the polymerization temperature is less than normal room temperature, the shortage would be economically at a disadvantage in unduly elongating the time required for the polymerization and necessitating provision of a new cooling means. Conversely, if the polymerization temperature exceeds100° C., the excess would be at a disadvantage in possibly imparting pores not uniform in diameter to the produced porous cross-linked polymer and degrading the absorption capacity of the porous cross-linked polymer.

(3) Polymerization Time

The method of this invention is effective as a means for stably implementing the polymerization in such a brief time as in the range of some tens of seconds to one hour. It may be particularly effective in completing the polymerization in a period of not more than 30 minutes. Of course, this invention does not exclude the adoption of a long polymerization time exceeding the upper limit of the range mentioned above.

(4) Polymerization Device

The polymerization device which can be used in this invention does not need to be particularly discriminated. Among chemical devices known to the art, that which fits for the relevant polymerization process may be utilized or used as duly modified. In the batch polymerization, for example, a polymerization vessel in a shape fit for the purpose for which the product is used can be used. Then, in the continuous polymerization method, a continuous polymerization device such as a belt conveyor can be used. These devices may be additionally provided with a temperature elevating means and a control means which fit such methods of polymerization as, for example, active thermal energy rays such as microwaves and infrared rays capable of utilizing radiation energy or hot water and hot air.

(5) Properties of Porous Material After Polymerization

The porous material after the polymerization can be designed in an arbitrary shape during the step of production mentioned above. This invention does not discriminate the porous material on account of the shape. In the case of the batch polymerization, for example, the porous material may be obtained in a shape identical with the inner shape of the polymerization vessel. Thus, the porous material may permit the manufacture of products of arbitrary shapes including a complicated three-dimensional shape, a simple cylindrical shape (having a circular cross section), an angular columnar shape (having an angular cross section), and even a sheet-like shape. For the purpose of imparting such an arbitrary shape to the product of the porous material, it suffices to select a polymerization vessel conforming to the shape aimed at such as, for example, a pair of dies or a casting metal vessel. It is further permissible to polymerize the HIPE in the shape of a proper block and cut or slide the polymerized block into sheets of a required profile. In the case of the continuous polymerization, the HIPE may be cast onto a belt conveyor in the shape of a sheet of a fixed thickness. Optionally, this sheet may be given a trapezoidal or semicircular cross section.

(6) Step of After-treatment (Reduction to Finished Product) after Formation of Porous Material The porous material according to this invention which can be obtained by the polymerization described above may be utilized as a water absorbing material, an oil absorbing material, a sound absorbing material, a filter, and the like. After the completion of the polymerization, the porous material may be optionally subjected to various treatments such as dehydration, washing, drying, cutting, and impregnation with various chemical agents to give a finished product. Now, these treatments will be described briefly below.

(a) Dehydration

The porous material produced in consequence of the completion of the polymerization may be generally dehydrated by compression, aspiration under a reduced pressure, or the combination thereof. Generally, the dehydration thus implemented may expel a portion in the range of 50 to 98% of the water used, while the remainder of the water would adhere to and remain on the porous material.

The ratio of dehydration may be properly set so as to suit for the purpose for which the porous material is intended, for example.

(b) Compression

The porous material according to this invention can be compressed to one of several parts of the original thickness by the method of pressing the porous material at a temperature and under a pressure which are incapable of breaking the porous texture thereof. The compressed sheet can have a small volume as compared with the original porous material and, therefore, permits a saving in the cost for transportation and storage. From the viewpoint of saving the space for transportation and storage as well as facilitating the handling, the compression to not more than ½ of the original thickness may prove to be effective. More preferably, this compression may be made to not more than ¼ of the original thickness.

(c) Washing

The porous material, for the purpose of imparting an improving surface condition thereto, may be washed with purified water or an aqueous solution or a solvent containing an arbitrarily selected additive.

(d) Drying

The porous material obtained by the steps mentioned above, when necessary, may be heated and dried with hot air or microwaves, or alternatively may be moistened for the adjustment of the water content thereof.

(e) Cutting

The porous material obtained by the steps mentioned above, when necessary, may be cut into proper sizes and worked to obtain a finished product fitting for the varying uses.

(f) Impregnation

The porous material obtained by the steps mentioned above, when necessary, may be impregnated with such an additive as a detergent, an aromatizer, a deodorant, a coloring agent, a wetting agent, and an antibacterial agent so as to be endowed with pertinent forms of functionality.

Now, this invention will be described more specifically below with reference to working examples. It should be noted that this invention should not be limited to these examples. The properties of the porous materials reported in these working examples were determined as shown below. Wherever "parts" is mentioned therein, they are meant as "parts by mass" unless otherwise specified.

<Methods for Determination of Ratio of Gel Portion and Residual Monomer Content>

(1) Ratio of Gel Portion

A porous material obtained by polymerizing an HIPE is dehydrated and cut to obtain two samples each measuring several cubic centimeters ($cm^3$). The porous material with water adhered is weighed to find the mass thereof. Subsequently, one of the samples is dried with a drying device and the dry polymer consequently obtained is weighed to find the mass thereof.

The other sample is placed in a Soxhlet extractor and extracted from acetone as a solvent therein for 24 hours. The porous material which remains after the extraction (gel component) is dried and weighed to find the dry gel mass.

Ratio of gel portion (%)=[(Dry gel mass)/(dry polymer mass)]×100

(2) Residual Monomer Content

The component monomers in the Soxlet extractor are determined by gas chromatography to find the total amount of the monomer components.

Residual monomer content (%)={(Total amount of monomers extracted)/[(dry polymer mass)+(total amount of monomers extracted)]}×100

EXAMPLE 1

In a cylindrical vessel provided with a stirrer, a monomer component consisting of 3.0 parts of 2-ethylhexyl acrylate and 1.8 parts of 55% divinyl benzene (p-ethyl-vinylbenzene as the remaining moiety) and 0.25 part of sorbitan monooleate as a surfactant (an emulsifier) were uniformly dissolved to prepare an oil-phase mixed solution (hereinafter abbreviated as "oil phase").

Separately, an aqueous water-phase solution (hereinafter abbreviated as "water phase") was prepared by dissolving3 parts of calcium chloride, 0.25 part of L-ascorbic acid and 0.05 part of ferrous sulfate heptahydrate as a reducing agent in 150 parts of purified water and was heated to 80° C.

The oil phase was kept stirred at 80° C. and the water phase adjusted in advance to 80° C. was added to the stirred oil phase over a period of five minutes. After this addition has been completed, the resultant mixture was stirred continuously for 10 minutes to obtain a stable HIPE (intermediate product) having a W/O ratio of 30/1. The HIPE thus obtained and 3 parts of an aqueous 10% hydrogen peroxide solution added thereto as a water-soluble oxidizing agent were stirred together for two minutes to afford an HIPE (completed product).

Then, the cylindrical vessel was deprived of the stirrer and immersed in a water bath at 80° C. and left therein for 60 minutes to effect the static polymerization (bath polymerization) of the HIPE. The porous material consequently obtained was tested for the ratio of gel portion and the residual monomer content. The experiment is outlined in Table 1 and the results of the determination are shown in Table 2.

EXAMPLE 2

An oil phase was prepared by uniformly dissolving a monomer component consisting of 3.0 parts of 2-ethylhexyl acrylate and 1.8 parts of 55% divinyl benzene and 0.25 part of sorbitan monooleate as a surfactant (an emusifier). Separately, a water phase was prepared by dissolving 2.4 parts of calcium chloride and 0.1 part of sodium hydrogen sulfite as a reducing agent in 250.0 parts of purified water and then heated to 70° C.

The oil phase and the water phase were continuously supplied at a W/O ratio of 50/1 into a stirrer and mixed and emulsified therein and the formed HIPE (intermediate product) was continuously extracted from the stirrer. The path for extracting the HIPE was furnished with a water-soluble oxidizing agent inlet. Via this inlet, potassium persulfate as a water-soluble oxidizing agent was continuously added to the HIPE at a rate of 0.04 part to 100 parts of the HIPE (2.2% by mass based on the monomer component mentioned above; the use ratio of the water-soluble oxidizing agent/the reducing agent (mass ratio) was fixed at 1/0.97). The HIPE and the oxidizing agent thus added were mixed by virtue of a line mixer to form an HIPE (completed product). This HIPE was continuously supplied in the form of a sheet measuring approximately 50 cm in width and about 1 cm in thickness onto a belt installed horizontally and kept in motion at a fixed rate.

The HIPE was passed through a polymerization zone controlled at about 70° C. over a period of about 20 minutes to be polymerized (for the continuous polymerization). The porous material, i.e. the polymerized product, was subsequently dehydrated and compressed under a reduced pressure using a compression roll, and dried with a hot air drier to form a compressed sheet of the porous material measuring about 2 mm in thickness. The porous material was tested for the ratio of gel portion and the residual monomer content. The experiment is outlined in Table 1 and the results by the determination are shown in Table 2.

EXAMPLE 3

An oil phase was prepared by uniformly dissolving a monomer component consisting of 3.0 parts of 2-ethylhexyl acrylate and 1.8 parts of 55% divinyl benzene and 0.35 part of sorbitan monooleate as a surfactant (an emusifier). Separately, a water phase was prepared by dissolving 3 parts of calcium chloride and 0.1 part of sodium hydrogen sulfite as a reducing agent in 254.4 parts of purified water and heated to 80° C.

The oil phase and the water phase were continuously supplied at a W/O ratio of 50/1 into a stirrer and mixed and emulsified therein and the formed HIPE (intermediate product) was continuously extracted from the stirrer. The path for extracting the HIPE was provided with a water-soluble oxidizing agent inlet. Via this inlet, sodium persulfate as a water-soluble oxidizing agent was continuously added to the HIPE at a rate of 0.04 part to 100 parts of the HIPE (2.2% by mass based on the monomer component mentioned above; the use ratio of the water-soluble oxidizing agent/the reducing agent (mass ratio) was fixed at 1/0.95). The HIPE and the oxidizing agent thus added were mixed by virtue of a line mixer to form an HIPE (completed product). This HIPE was continuously supplied in the form of a sheet measuring approximately 50 cm in width and about 1 cm in thickness onto a belt installed horizontally and kept in motion at a fixed rated.

The HIPE was passed through a polymerization zone controlled at about 80° C. over a period of about 10 minutes to be polymerized (for the continuous polymerization). The porous material, i.e. the polymerized product, was subsequently dehydrated and compressed under a reduced pressure using a compression roll, and dried with a hot air drier to form a compressed sheet of the porous material measuring about 2 mm in thickness. The porous material was tested for the ratio of gel portion and the residual monomer content. The experiment is outlined in Table 1 and the results by the determination are shown in Table 2.

EXAMPLE 4

An oil phase was prepared by uniformly dissolving a monomer component consisting of 0.7 part of styrene, 2.7 parts of 2-ethylhexyl acrylate and 1.4 parts of 55% divinyl benzene and 0.25 part of sorbitan monooleate as a surfactant (an emulsifier). Separately, a water phase was prepared by dissolving 2.4 parts of calcium chloride and 0.1part of sodium hydrogen sulfite as a reducing agent in 250.0 parts of purified water and heated to 65° C.

The oil phase and the water phase were continuously supplied at a W/O ratio of 50/1 into a stirrer and mixed and emulsified therein and the formed HIPE (intermediate product) was continuously extracted from the stirrer. The path for extracting the HIPE was provided with a water-soluble oxidizing agent inlet. Via this inlet, sodium persulfate as a water-soluble oxidizing agent was continuously added to the HIPE at a rate of 0.04 part to 100 parts of the HIPE (2.2% by mass based on the monomer component mentioned above; the use ratio of the water-soluble oxidizing agent/the reducing agent (mass ratio) was fixed at 1/0.97). The HIPE and the oxidizing agent thus added were mixed by virtue of a line mixer to form an HIPE (completed product). This HIPE was continuously supplied in the form of a sheet measuring approximately 50 cm in width and about 1 cm in thickness onto a belt installed horizontally and kept in motion at a fixed rate.

The HIPE was passed through a polymerization zone controlled at about 70° C. over a period of about 20 minutes to be polymerized (for the continuous polymerization). The porous material, i.e. the polymerized product, was subsequently dehydrated and compressed under a reduced pressure using a compression roll, and dried with a hot air drier to form a compressed sheet of the porous material measuring about 2 mm in thickness. The porous material was tested for the ratio of gel portion and the residual monomer content. The experiment is outlined in Table 1 and the results by the determination are shown in Table 2.

COMPARATIVE EXAMPLE 1

When the procedure of Example 2 was repeated except for that the potassium persulfate as the water-soluble oxidizing agent was not added to the HIPE extracted from the stirrer but was added in advance in an amount of 0.1 part together with the reducing agent to the water phase, a porous material as a polymer partly was observed to be occurred in the stirrer for forming the HIPE to generate a deposit on the stirrer and the extraction path and impair the uniformity of the HIPE, with the result that the porous material as the target polymer showed an undulating surface and betray deficiency in the accuracy of thickness. The experiment is outlined in Table 1 and the test results are shown in Table 2.

COMPARATIVE EXAMPLE 2

The procedure of Example 3 was repeated except for that the water phase was prepared by dissolving 0.1 part of sodium persulfate as a water-soluble oxidizing agent in place of 0.1 part of sodium hydrogen sulfite as a reducing agent in 254.4 parts of purified water and sodium hydrogen sulfite as a reducing agent was continuously added to the formed HIPE at a rate of 0.04 part based on 100 parts of the HIPE (2.2% by mass based on the monomer component mentioned above; the use ratio (mass ratio) of the water-soluble oxidizing agent/the reducing agent was set at 1/1.05). As a result, the HIPE was partly polymerized to render the state of emulsion slightly uneven, impart a discernible undulation to the surface of the porous material as the target product of polymerization, and cause the porous material to betray deficiency in the accuracy of thickness. The experiment is outlined in Table 1 and the results of test are shown in Table 2.

COMPARATIVE EXAMPLE 3

The procedure of Example 4 was repeated except for that the use of sodium hydrogen sulfite as a reducing agent was omitted. The porous material consequently obtained was tested for the ratio of gel portion and the residual monomer content. The experiment is outlined in Table 1 and the results of test are shown in Table 2.

TABLE 1

| | Oxidizing agent/ Reducing agent | | | | Temperature for HIPE | Polymerization conditions | | Ratio of gel |
| --- | --- | --- | --- | --- | --- | --- | --- | --- |
| | Before HIPE formation | After HIPE formation | Monomer | Polymerization method | formation (° C.) | Temperature (° C.) | Time (Min) | portion (%) |
| Example 1 | L-ascorbic acid plus ferrous salt | Hydrogen peroxide | 2EHA/DVB | Batch | 80 | 80 | 60 | 80 |
| Example 2 | SBS | KPS | 2EHA/DVB | Continuous | 70 | 70 | 20 | 85 |
| Example 3 | SBS | NaPS | 2EHA/DVB | Continuous | 80 | 80 | 10 | 82 |
| Example 4 | SBS | NaPS | ST/2EHA/DVB | Continuous | 65 | 75 | 20 | 86 |
| Comparative Example 1 | KPS/SBS | — | 2EHA/DVB | — | 70 | Polymerization started during the emulsification, inferior emulsification | | |
| Comparative Example 2 | NaPS | SBS | 2EHA/DVB | — | 80 | Polymerization started during the emulsification, slightly inferior emulsification | | |
| Comparative Example 3 | — | KPS | 2EHA/DVB | Continuous | 70 | 70 | 20 | 10 |

Note) SBS: Sodium hydrogen sulfite; KPS: Potassium persulfate; NaPS: Sodium persulfate; 2EHA: 2-Ethylhexyl acrylate; DVB: divinyl benzene; ST: Styrene.

TABLE 2

| | Ratio of gel portion (%) | Residual monomer content (%) |
| --- | --- | --- |
| Example 1 | 80 | Not more than 0.1 |
| Example 2 | 85 | Not more than 0.1 |
| Example 3 | 82 | Not more than 0.1 |
| Example 4 | 86 | Not more than 0.1 |
| Comparative Example 1 | 65 | 1.2 |
| Comparative Example 2 | 75 | 0.3 |
| Comparative Example 3 | 10 | Large amount |

The entire disclosure of Japanese Patent Application No. 11-328,682 filed on Nov. 18, 1999 including specification, claims, drawings and summary are incorporated herein by reference in its entirety.

What is claimed is:
1. A method for the production of a porous material, comprising:

preparing a water-in-oil type high internal phase emulsion containing a reducing agent and polymerizable monomers by emulsifying an oil phase with a water phase, adding a water-soluble oxidizing agent to said emulsion, thereby forming a redox type initiator therein, and polymerizing said monomers in said emulsion, wherein said reducing agent and monomers are preparatorily added to said water or oil phase before the preparation of said emulsion.

2. A method according to claim 1, wherein the difference between the temperature for forming said emulsion and the polymerization temperature of said emulsion is not more than 20° C.

3. A method according to claim 1, wherein the temperature for forming said emulsion and the polymerization temperature of said emulsion are both not less than 40° C.

4. A method according to claim 1, wherein said polymerization step comprises a continuous polymerization.

* * * * *